(12) United States Patent
Miao

(10) Patent No.: US 7,242,707 B1
(45) Date of Patent: Jul. 10, 2007

(54) MULTIBAND ULTRA WIDEBAND COMMUNICATIONS

(76) Inventor: George J. Miao, 2 Inverness Dr., Marlboro, NJ (US) 07746

( * ) Notice: Subject to any disclaimer, the term of this patent is extended or adjusted under 35 U.S.C. 154(b) by 756 days.

(21) Appl. No.: 10/624,999

(22) Filed: Jul. 22, 2003

(51) Int. Cl.
H04B 1/69 (2006.01)
H04B 1/707 (2006.01)
H04K 1/10 (2006.01)
(52) U.S. Cl. .................. 375/130; 375/144; 375/260
(58) Field of Classification Search .......... 375/130, 375/141, 144, 148, 260
See application file for complete search history.

(56) References Cited

U.S. PATENT DOCUMENTS

| 2003/0053521 A1* | 3/2003 | Huang et al. ............ 375/144 |
| 2004/0047285 A1* | 3/2004 | Foerster et al. .......... 370/210 |
| 2004/0141559 A1* | 7/2004 | Tewfik et al. ............ 375/248 |

* cited by examiner

*Primary Examiner*—Don N. Vo

(57) ABSTRACT

A multiband ultra wideband (UWB) communication is presented to implement multichannel shaped-pulses in parallel for indoor and outdoor UWB operations. The multiband UWB communication has a flexibility to transmit and receive a scalability data rate on the multichannel with lower power consumption.

20 Claims, 16 Drawing Sheets

MULTIBAND ULTRA WIDEBAND COMMUNICATIONS

BACKGROUND

This invention is generally relative to multiband ultra wideband (UWB) communications for short-distance wireless broadband communications.

U.S. Federal Communications Commission (FCC) released the revision of Part 15 of the Commission's rules regarding UWB transmission systems to permit the marketing and operation of certain types of new products incorporating an UWB technology on Apr. 22, 2002. With an appropriate technology, UWB devices are able to operate using spectrum occupied by existing radio service without causing interference. This allows scarce spectrum resources to be used more efficiently. The UWB technology offers significant benefits not only for Government and public safety but also for businesses and consumers under an unlicensed basis of operation spectrum.

In general, FCC is adapting unwanted emission limits for the UWB devices that are significantly more stringent than those imposed on other Part 15 devices. This is to say that FCC limits an outdoor use of UWB devices to handheld devices for the short-distance wireless broadband communications. For an indoor operation of UWB communications FCC provides a wide variety of the UWB devices, such as high-speed home and business networking devices under the Part 15 of the Commission's rules subject to certain frequency and power limitations. In short, the UWB devices must operate in the frequency band from 3.1 GHz to 10.6 GHz. In addition, the UWB devices should satisfy the Part 15.209 limit for the frequency band below 960 MHz and must meet the FCC's emission masks for the frequency band above 960 MHz.

For the indoor operation of UWB communications, Table 1 lists the FCC restrictions of the emission masks (dBm) along with the frequencies (GHz).

TABLE 1

| Frequency (MHz) | EIRP (dBm) |
| --- | --- |
| 0-960 | −41.3 |
| 960-1610 | −75.3 |
| 1610-1990 | −53.3 |
| 1990-3100 | −51.3 |
| 3100-10600 | −41.3 |
| Above 10600 | −51.3 |

Outdoor handheld UWB devices are intended to operate in a peer-to-peer mode without restrictions on a location. The outdoor handheld UWB devices have extremely conservative out of band emission masks to address interference with other communication devices. Table 2 shows UWB emission masks for outdoor operations:

TABLE 2

| Frequency (MHz) | EIRP (dBm) |
| --- | --- |
| 0-960 | −41.3 |
| 960-1610 | −75.3 |
| 1610-1900 | −63.3 |
| 1900-3100 | −61.3 |
| 3100-10600 | −41.3 |
| Above 10600 | −61.3 |

FCC defines an UWB device where the fractional frequency bandwidth is greater than 0.25 based on the formula as follows:

$$FB = 2\left(\frac{f_H - f_L}{f_H + f_L}\right), \quad (1)$$

where $f_H$ is the upper frequency of the −10 dB emission point and $f_L$ is the lower frequency of the −10 dB emission point. The center frequency of UWB transmission is defined as the average of the upper and lower −10 dB points as follows:

$$F_C = \frac{f_H + f_L}{2}. \quad (2)$$

In addition, a minimum frequency bandwidth of 500 MHz must be used for indoor and outdoor UWB communication devices regardless of the center frequency.

Thus, the UWB communication devices must be designed to ensure that the indoor operations can only occur in an indoor environment according to the indoor emission masks as shown in Table 1. The outdoor operations must be according to the outdoor emission masks in Table 2. The UWB communication devices are used for short-range high-speed data transmissions suitable for wireless broadband access to networks.

The UWB communication devices, which are to be developed, are digital radio communications that belong to a wireless broadband communication technology fundamentally. The UWB communication devices transmit a sequence of very short electrical pulses, billionths of a second long, which exist not only on any particular frequency but also on all frequencies simultaneously. The UWB communication devices employ modulated pulses with less one nanosecond in duration. The modulated pulses can be assigned by a digital representation of "0" or "1" according to the transmitted and received pulse based on where the pulses are place in time. In other words, turning the modulated pulses for the wireless broadband communications lies in the timing of the pulses. Therefore, in order to recognize the information in a digital pulse sequence, an UWB receiver has to know the exact pulse sequence used by a transmitter.

Each of the modulated pulses can exist simultaneously across an extensive frequency band if the distributed energy of the modulated pulses at any given frequency exists in the noise floor. Because of the above reason, the UWB devices can co-exist with other communication devices with no discernable interference. Therefore, this opens vast new communications providing tremendous wireless bandwidth to ease the growing bandwidth crunch.

Transmitting the modulated pulses with a very-high data rate over the frequency ranges from 3.1 GHz to 10.6 GHz requires an analog-to-digital (A/D) converter with a very-high sampling rate $F_S$ in order to implement the UWB receiver in a digital domain directly. Furthermore, due to the FCC emission limitations of the indoor and outdoor operations, transmitting the modulated pulses should be shaped in such a way that the transmitted pulses must not validate the FCC emission limitation. This leads to high requirements for designing a digital-to-analog (D/A) converter and a transmitter filter in an UWB transmitter. However, it is difficult to design the A/D and D/A converters with such a very high sampling rate for an UWB communication transceiver. In addition, the UWB communication transceiver does not have a flexibility and scalability to transmit and receive the modulated pulses if the UWB communication transceiver is designed to use the entire frequency band from 3.1 GHz to 10.6 GHz as one single-band operation.

The present invention uses a multiband with a multicarrier solution to form 11 multichannels for the UWB communication transceiver. Each multichannel has a frequency bandwidth of 650 MHz, which allows transmitting a data rate at 650 Msps. Shaped pulses that meet the FCC requirements of emission limitations for the indoor or outdoor operation can be transmitted on all of the multichannels at the same time. This is to say that the UWB communication transceiver is able to transmit a total of data rate up to 7.15 Gsps. As a result, the UWB communication transceiver can transmit a data rate with flexibility and scalability. Moreover, the sampling rate of the A/D and D/A converters can be reduced because of using a multiband approach to substitute a single wideband approach. In addition, the present invention is a single device of the UWB communication transceiver, which can be used to deal with a dual-mode indoor and outdoor operation. This leads to saving cost for the UWB communication transceiver.

Thus, there is a continuing need for the UWB communication transceiver employing a new dual-mode shaped pulse architecture based on a multiband and multicarrier solution for the indoor and outdoor operations.

SUMMARY

In accordance with one aspect, a multiband UWB communication transmitter may include an encoder coupled to an interleaver the interleaver coupled to a polyphase-based multichannel, the polyphase-based multichannel coupled to a shaped pulse generator, the shaped pulse generator coupled to a multichannel-based multicarrier modulator, the multichannel-based multicarrier modulator coupled to a power amplifier (PA), a clock control coupled to the polyphase-based multichannel, the shaped pulse generator, and the multichannel-based multicarrier modulator.

Other aspects are set forth in the accompanying detailed description and claims.

DETAILED DESCRIPTION

Some embodiments described herein are directed to a multiband UWB communication transceiver for the indoor and outdoor operations. The multiband UWB communication transceiver may be implemented in hardware, such as in an Application Specific Integrated Circuits (ASIC), digital signal processor, field programmable gate array (FPGA), software, and/or a combination of hardware and software.

Figure 1:
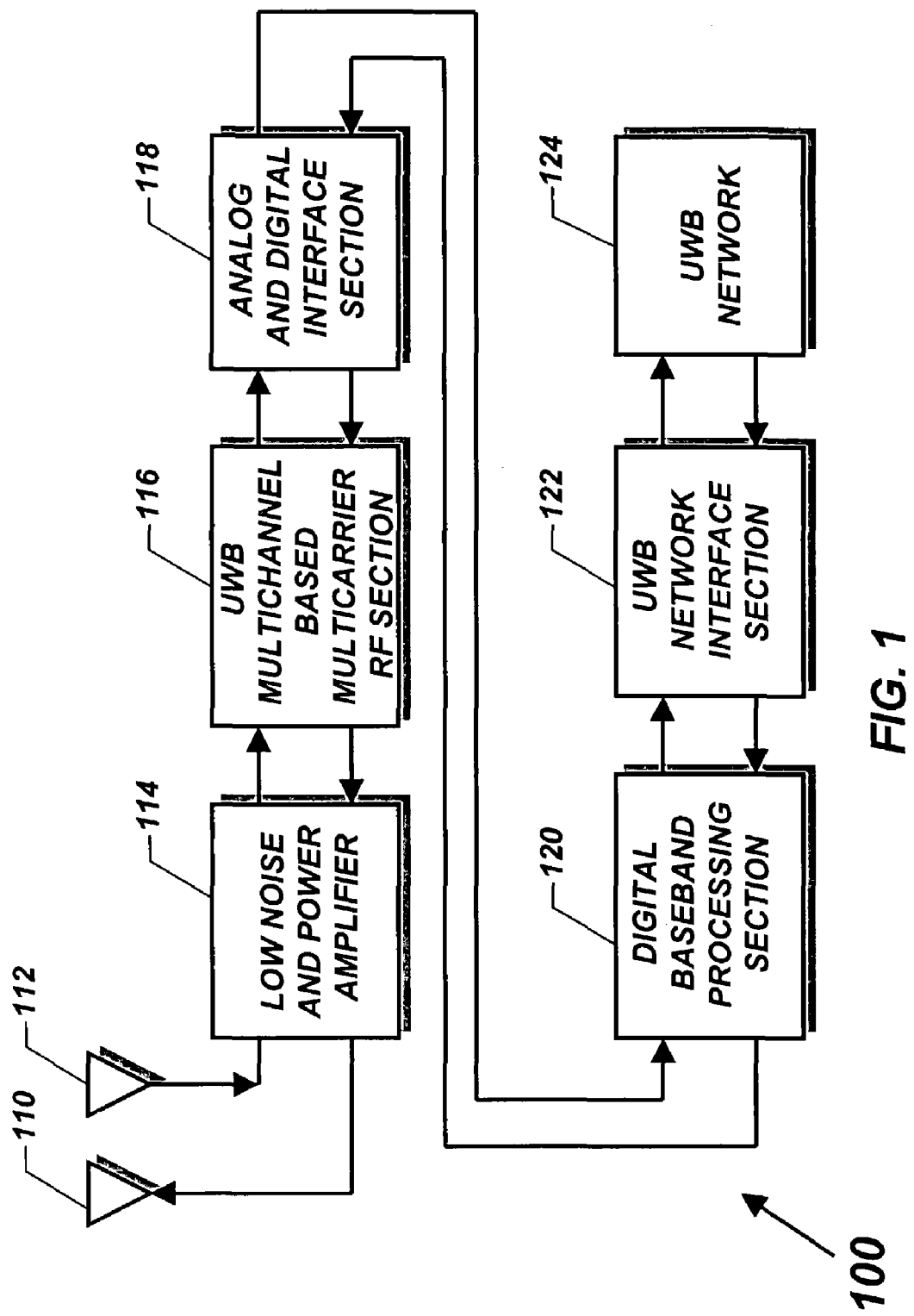
FIG. 1 shows a block diagram of a multiband UWB communication transceiver for indoor and outdoor operations according to one embodiment.

A multiband UWB communication transceiver 100 for the indoor and outdoor operations is illustrated in FIG. 1 in accordance with one embodiment of the present invention. The multiband UWB communication transceiver 100 includes a low noise amplifier (LNA) and power amplifier (PA) section 114 that receives and transmits multiband UWB signals from an antenna 112 and to an antenna 110. The LNA and PA section 114 is coupled to a UWB multichannel-based multicarrier RF section 116. The UWB multichannel-based multicarrier RF section 116 is connected to an analog and digital interface section of 118 that contains analog-to-digital (A/D) and digital-to-analog (D/A) converters. The analog and digital interface section 118 is coupled to an digital baseband processing section 120, which performs polyphase multichannel digital transmission and receiver filtering, rake processing, shaped pulse generation, interleave/de-interleave, and code/de-code processing. The digital baseband processing section 120 has an interface with an UWB network interface section 122, which is coupled to an UWB network 124. In accordance with one embodiment of the present invention, the multiband UWB communication transceiver 100 is used for the indoor and outdoor operations. The multiband UWB communication transceiver 100 can transmit and receive speech, audio, images and video, and data information for indoor and outdoor wireless broadband communications.

The multiband UWB communication transceiver 100 has a flexibility to transmit and receive UWB signals by using one channel and/or up to 11 channels in parallel. Each channel of the UWB communication transceiver 100 has a frequency bandwidth of 650 MHz that can transmit a data rate of 650 Msps. As a result, the UWB communication transceiver 100 is able to transmit and receive the data rate up to 7.150 Gsps by using all of the channels in parallel.

Figure 2:
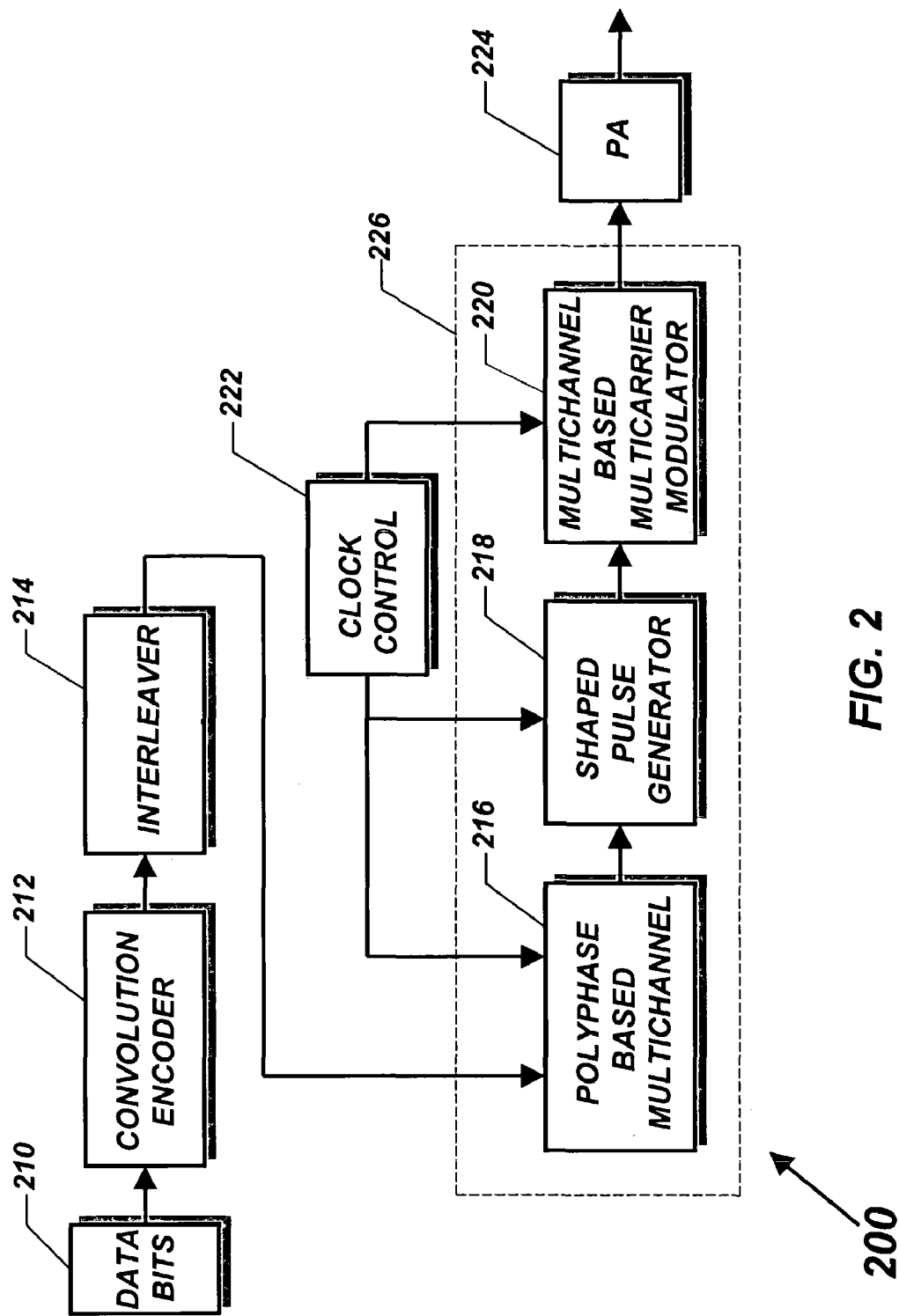
FIG. 2 is a block diagram of a multiband UWB communication transmitter for the indoor and outdoor operations according to some embodiments.

FIG. 2 is the block diagram of a multiband UWB communication transmitter 200 for the indoor and outdoor operations according to some embodiments. The multiband UWB communication transmitter 200 receives user data bits 210 at a data rate of 3,575 Mbps. The user data bits 210 are passed through a ½-rate convolution encoder 212 that may produce a double data rate of 7.150 Msps by adding redundancy bits. A symbol data, which is an output sequence of the ½-rate convolution encoder 212, is then interleaved by using an interleaver 214. Thus, the output symbols of the interleaver 214 are formed into 11-multichannel by using a polyphase-based multichannel 216. A symbol data rate of each channel is 650 Msps. The polyphase-based multichannel 216 is to perform a serial data into a parallel data by using a polyphase operation. The polyphase-based multichannel 216 is coupled to a shaped pulse generator 218 that generates the shaped digital pulses for the polyphase-based multichannel 216 based on an individual symbol. Each of the shaped digital pulses has a frequency bandwidth of 650 MHz at −10 dBm and −20 dBm for the indoor and outdoor operations, respectively. The output shaped digital pulses of the polyphase-based multichannel 216 are then modulated with multi-carrier frequencies by using a multichannel-based multi-carrier modulator 220. A clock control 222 is used to control the polyphase-based multichannel 216, the shaped pulse generator 218, and the multichannel-based multicarrier modulator 220. Thus, the output shaped digital pulses of the multichannel-based multi-carrier modulator 220 are passed a power amplifier (PA) 224 through an antenna into air. The entire subsystem section 226 is referred to as a polyphase multichannel-based multicarrier pulse generator.

Figure 3:
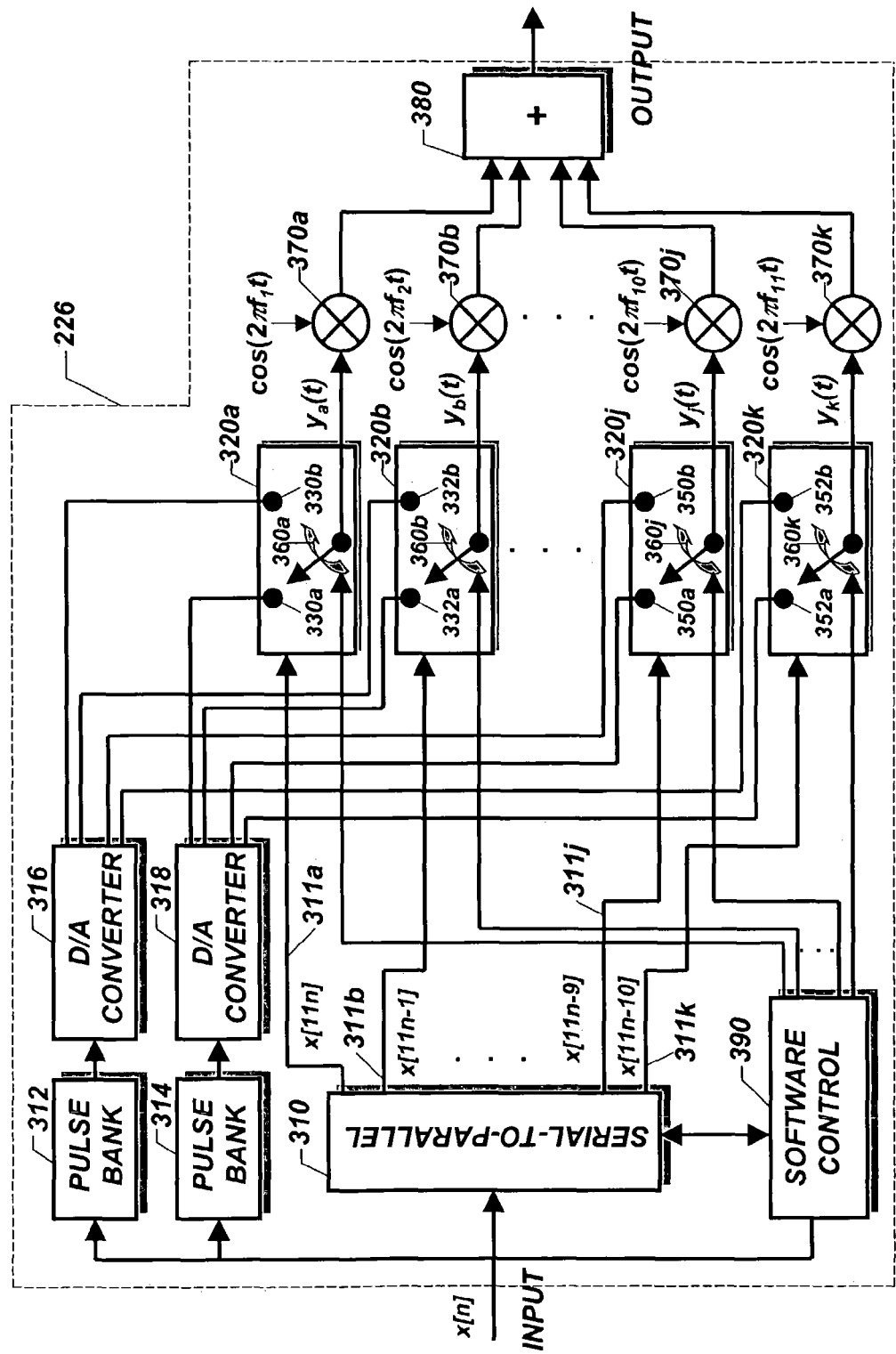
FIG. 3 is a detailed block diagram of a polyphase-based multichannel and multicarrier of the UWB communication transmitter according to some embodiments.

Referring to FIG. 3 is a detail block diagram of the polyphase multichannel-based multicarrier pulse generator 226 according to some embodiments. An input signal is assumed as x[n], where x[n] is an either "1" or "0" sequence for a serial-to-parallel (S/P) unit 310, which is a polyphase structure downsampling by 11. The output of the S/P unit 310 contains 11 channels labeled from 311a to 311k in a parallel operation. Correspondingly, the output signals of the S/P unit 310 are x[11n], x[11n−1], . . . , x[11n−9] and x[11n−10], which are as the input signals for a set of parallel multichannel switch units 320a, 320b, . . . , 320j, 320k, respectively. A software control unit 390 determines whether a symbol is 1 or 0 for all of the channels 311a-311k. For example, channel 331a, if the signal x[11n] is "1", and then a switch 360a is connected to a position 330a. Thus, a positive pulse bank 314 that contained an positive indoor shaped digital pulse or an positive outdoor shaped digital pulse is coupled to a D/A converter 318 to generate an analog shaped pulse $y_a(t)$ for the channel 331a. The analog shaped pulse $y_a(t)$ is then multiplied by a carrier function of $\cos(2\pi f_1 t)$ 370a to produce the first bandpass signal for the channel 331a. Otherwise, the switch 360a is connected to a position 330b if the signal x[n] is "0" symbol. A negative pulse bank 312, which contained a negative indoor shaped digital pulse or a negative outdoor shaped digital pulse, is coupled to a D/A converter 316 to generate an analog shaped pulse $y_a(t)$ for the channel 331a. Then, the analog shaped pulse $y_a(t)$ is multiplied by the carrier function of $\cos(2\pi f_1 t)$ 370a to produce the first bandpass signal for the channel 331a. In a similar way, the polyphase multichannel-based multicarrier pulse generator 226 generates analog shaped pulses $y_a(t), \ldots, y_k(t)$ for all of the channels 311a to 311k. Thus, the entire analog shaped pulses $y_a(t), \ldots, y_k(t)$ are coherently added together to pass a PA 224 through an antenna into air.

Figure 4:
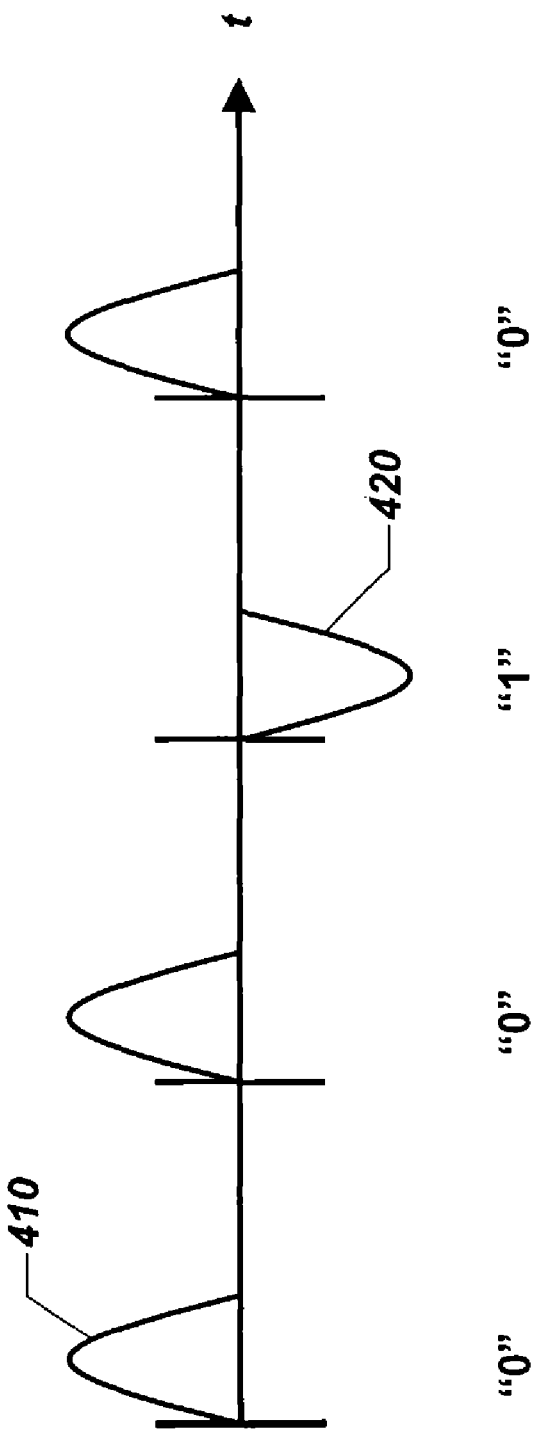
FIG. 4 is a binary phase-shift keying (BPSK) modulation relationship between a shaped pulse sequence and a binary symbol sequence according to some embodiments.

Referring to FIG. 4 is a relationship 400 between a shaped digital pulse sequence and a binary symbol sequence based on a BPSK modulation for the multiband UWB communication transmitter according to some embodiments. A shaped digital pulse 410 represents "1" binary symbol while a shaped digital pulse 420 represents "0" binary symbol. The shaped digital pulse 410 is referred to as a "positive" pulse and the shaped digital pulse 420 is referred to as a "negative" pulse. A self-correlation of the shaped digital pulse 410 and 420 has a positive value close to "1". On the other hand, a cross-correlation between the shaped digital pulse 410 and the shaped digital pulse 420 has a negative value close to "−1".

Figure 5:
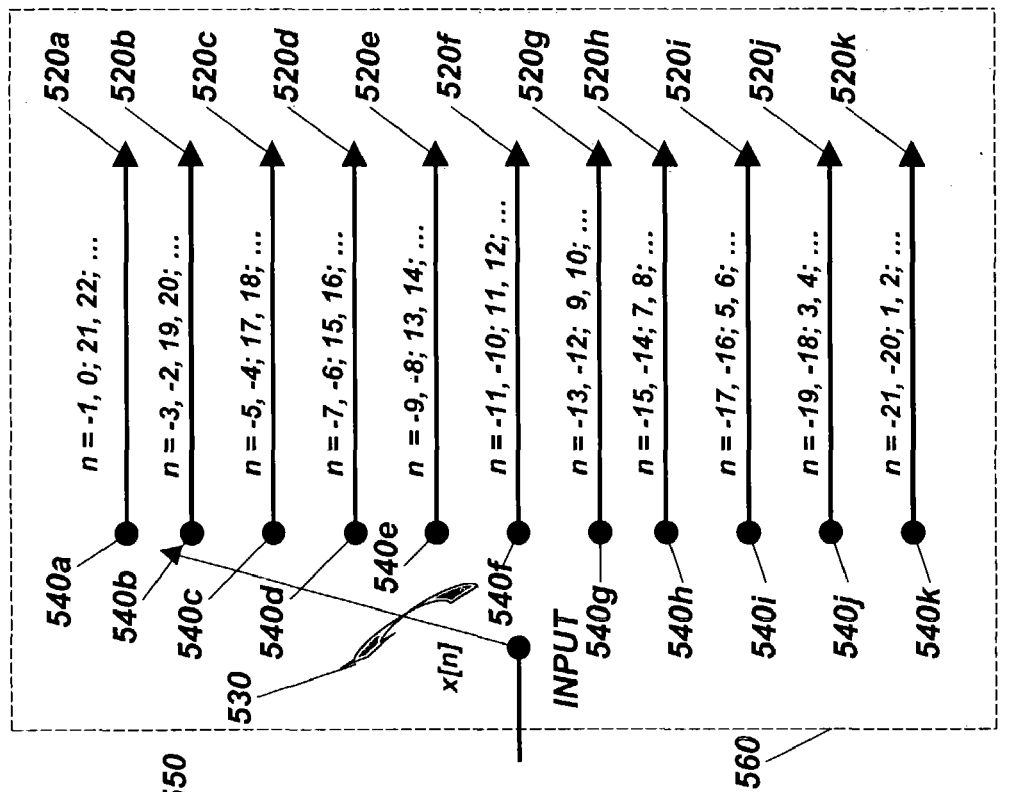
FIG. 5 is a two-block diagram of a polyphase-based serial-to-parallel (S/P) multichannel according to some embodiments.
Figure 5:
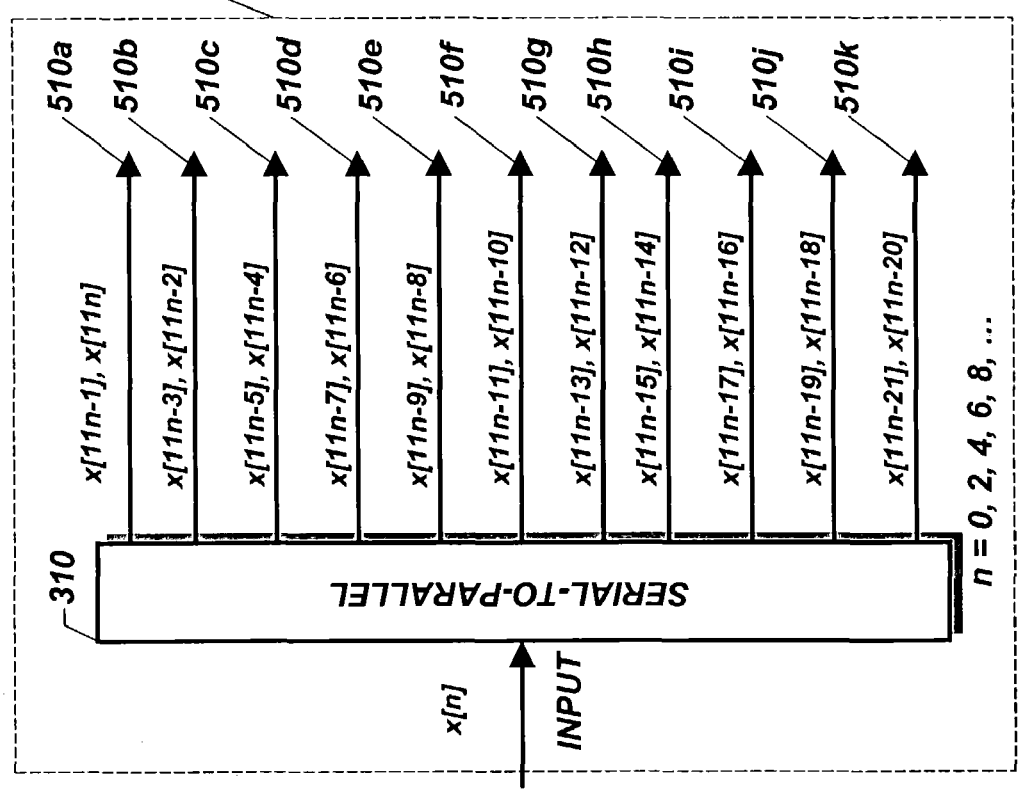

FIG. 5 is a detailed block diagram 500 of a polyphase-based S/P multichannel based on a QPSK modulation for the indoor or outdoor operations according to some embodiments. In the detailed block diagram 550, an input sequence x[n] with either 1 or 0 symbol sequence passes through the S/P unit 310 to generate 11 channel sequences 510a-510k. Determining each channel of the sequences 510a-510k is based on the formula: {x[11n−1], x[11n]}; {x[11n−3], x[11n−2]}; {x[11n−5], x[11n−4]}; {x[11n−7], x[11n−6]}; {x[11n−9], x[11n−8]}; {x[11n−11], x[11n−10]}; {x[11n−13], x[11n−12]}; {x[11n−15], x[11n−14]}; {x[11n−17], x[11n−16]}; {x[11n−19], x[11n−18]}; and {x[11n−21], x[11n−20]}, for n=0, 2, 4, 6, . . . , respectively. On the other hand, using an alternative approach as shown in a block diagram 560 can also perform the polyphase-based S/P multichannel to achieve the same output as the block diagram 550 does. A switch 530 rotates connecting to one of the eleven positions 540a-540k at uniform speed. For example, the switch 530 is connected to the position 540a for the first channel when n=−1,0, 21, 22, . . . . The switch 530 is connected to the position 540b for the second channel when n=−3, −2, 19, 20, . . . , and so on. During the process, the switch 530 is controlled by a software control unit 390.

Figure 6:
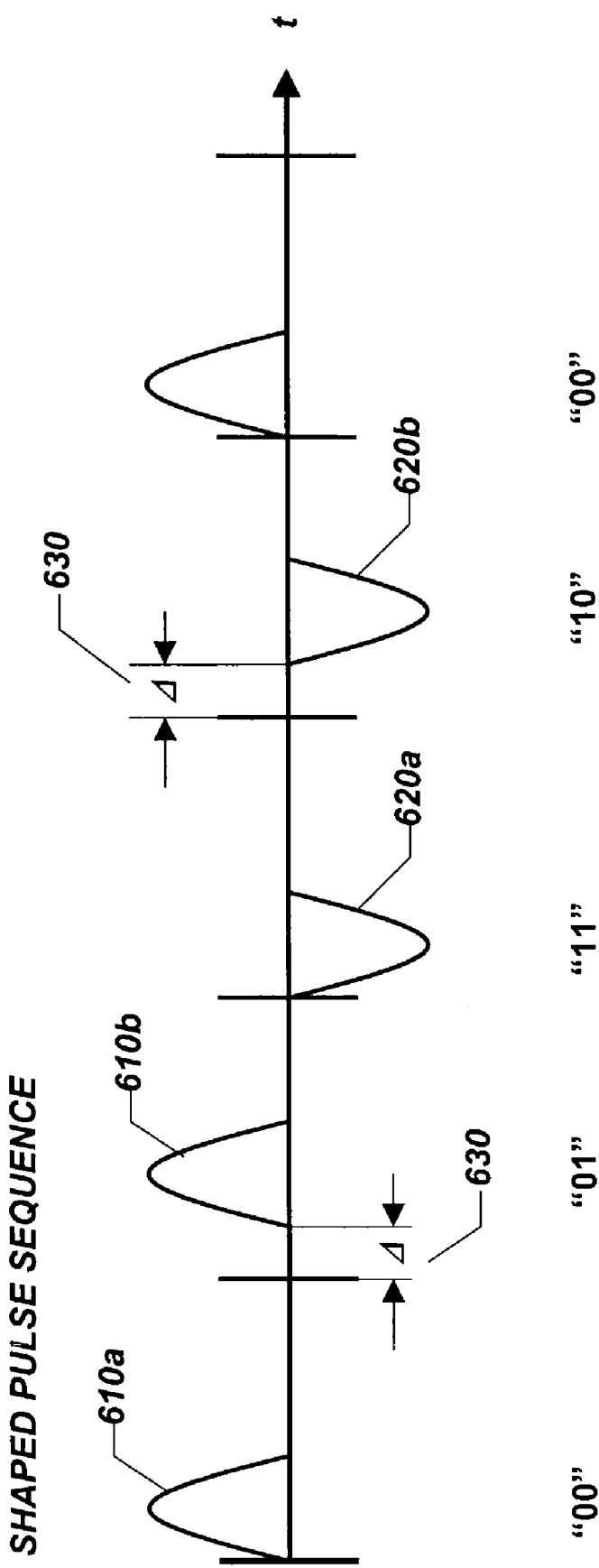
FIG. 6 is a quadrature phase-shift keying (QPSK) modulation relationship between the shaped pulse sequence and the binary symbol sequence according to some embodiments.

FIG. 6 is a QPSK relationship 600 between the shaped digital pulse sequences and the binary symbol sequences based on every two symbols. A positive shaped digital pulse 610a represents two symbols "00". The positive shaped digital pulse 610b, with a delay time Δ, represents two symbols "01". A negative shaped digital pulse 620a represents two symbols "11". The negative shaped digital pulse 620b having the delay time Δ represents two symbols "10". This expression uses one shaped digital pulse to represent two symbols for transmitting.

Figure 7:
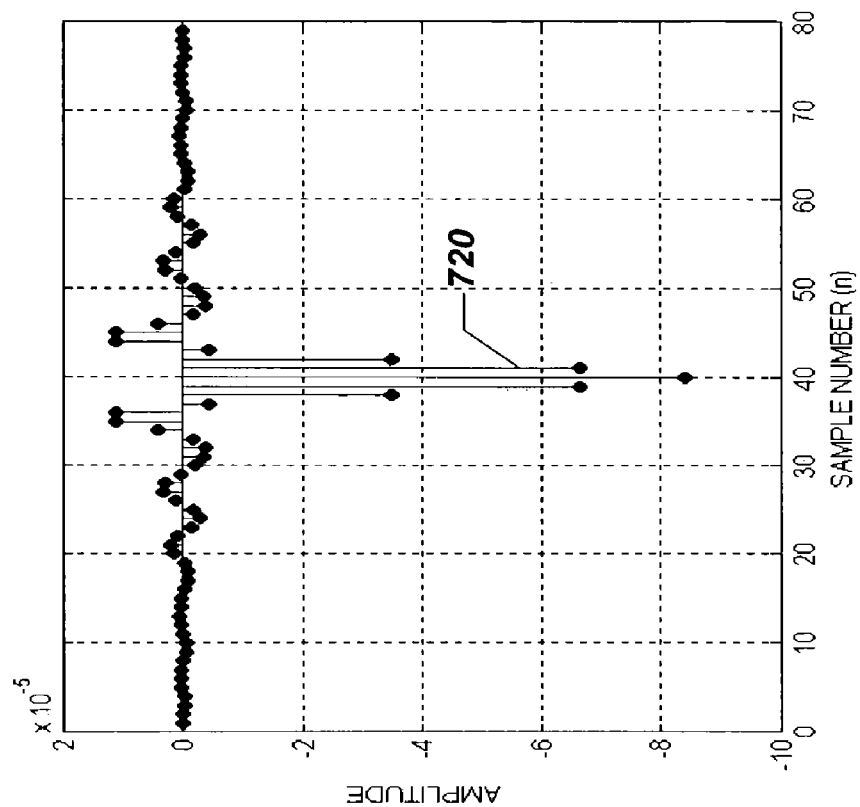
FIG. 7 is shaped digital pulses for an indoor UWB communication transmitter according to some embodiments.
Figure 7:
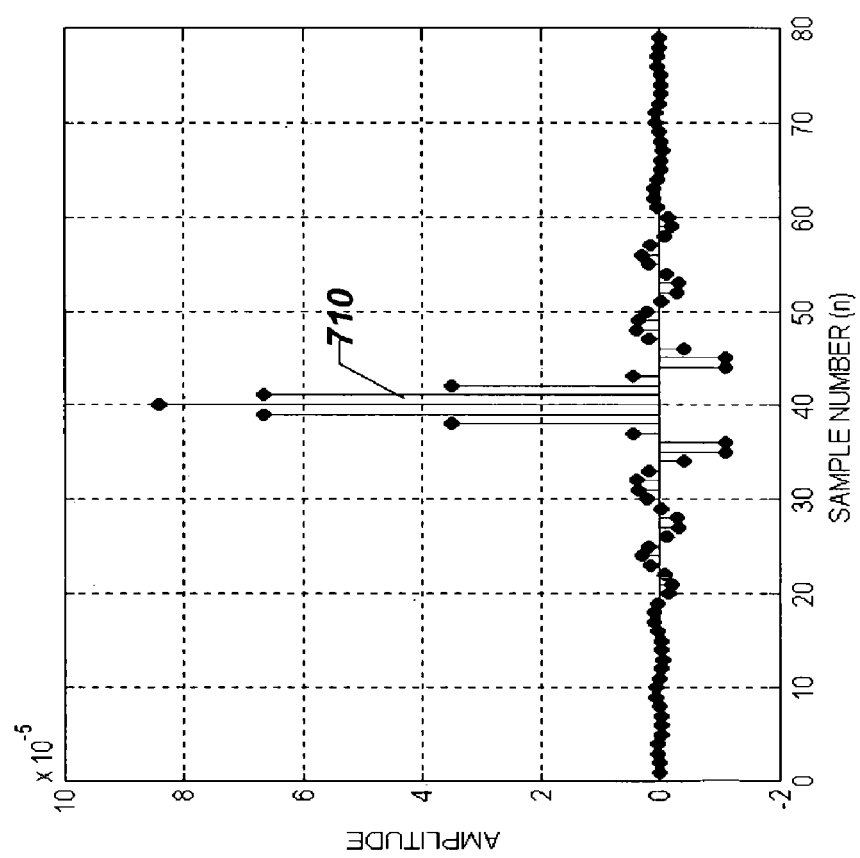

Referring to FIG. 7 is impulse responses 700 of the positive indoor shaped digital pulse ($h_{in}[n]$) 710 and the negative indoor shaped digital pulse ($-h_{in}[n]$) 720, with a linear phase. A difference between the positive indoor shaped digital pulse 710 and the negative indoor shaped digital pulse 720 is a phase difference. These two shaped digital pulses 710 and 720 are stored into the pulse banks 312 and 314, where are ROM or RAM memory banks. The impulse response of the positive indoor shaped digital pulse 710 is listed in Table 3.

TABLE 3

| Pulse taps | Value |
|---|---|
| h[0] | 8.4011931856093516e−005 |
| h[−1],h[1] | 6.6460293297797776e−005 |
| h[−2],h[2] | 3.4899656505824461e−005 |
| h[−3],h[3] | 4.3116710798781203e−006 |
| h[−4],h[4] | −1.1214285545543695e−005 |
| h[−5],h[5] | −1.1091966005094216e−005 |
| h[−6],h[6] | −4.0631985867674594e−006 |
| h[−7],h[7] | 1.6925543297452028e−006 |
| h[−8],h[8] | 3.7995683513152043e−006 |
| h[−9],h[9] | 3.5715207002110990e−006 |
| h[−10],h[10] | 2.1069446071156423e−006 |
| h[−11],h[11] | −3.6643652826194515e−007 |
| h[−12],h[12] | −2.8164861523475095e−006 |
| h[−13],h[13] | −3.3131485713709617e−006 |
| h[−14],h[14] | −1.1423931641665744e−006 |
| h[−15],h[15] | 1.8766255546648780e−006 |
| h[−16],h[16] | 3.0434874609545600e−006 |
| h[−17],h[17] | 1.5335471709233686e−006 |
| h[−18],h[18] | −9.2517743205833720e−007 |
| h[−19],h[19] | −2.0795608829123639e−006 |
| h[−20],h[20] | −1.3294520798670319e−006 |
| h[−21],h[21] | 1.5173609022831139e−007 |
| h[−22],h[22] | 1.0025701140610793e−006 |
| h[−23],h[23] | 8.8427894743416094e−007 |
| h[−24],h[24] | 3.2126248293514667e−007 |
| h[−25],h[25] | −1.6257131448705735e−007 |
| h[−26],h[26] | −4.2373069355925035e−007 |
| h[−27],h[27] | −4.9081265774967211e−007 |
| h[−28],h[28] | −3.2008852157750218e−007 |
| h[−29],h[29] | 7.1976640681523624e−008 |

TABLE 3-continued

| Pulse taps | Value |
|---|---|
| h[−30],h[30] | 4.4865425611366231e−007 |
| h[−31],h[31] | 4.8145760999611724e−007 |
| h[−32],h[32] | 1.1716686662078990e−007 |
| h[−33],h[33] | −3.2175597663148811e−007 |
| h[−34],h[34] | −4.3124038368895124e−007 |
| h[−35],h[35] | −1.5028657655143136e−007 |
| h[−36],h[36] | 2.0356981673707622e−007 |
| h[−37],h[37] | 2.8036698051837603e−007 |
| h[−38],h[38] | 7.1364948530875849e−008 |
| h[−39],h[39] | −1.4582779654249872e−007 |

Figure 8:
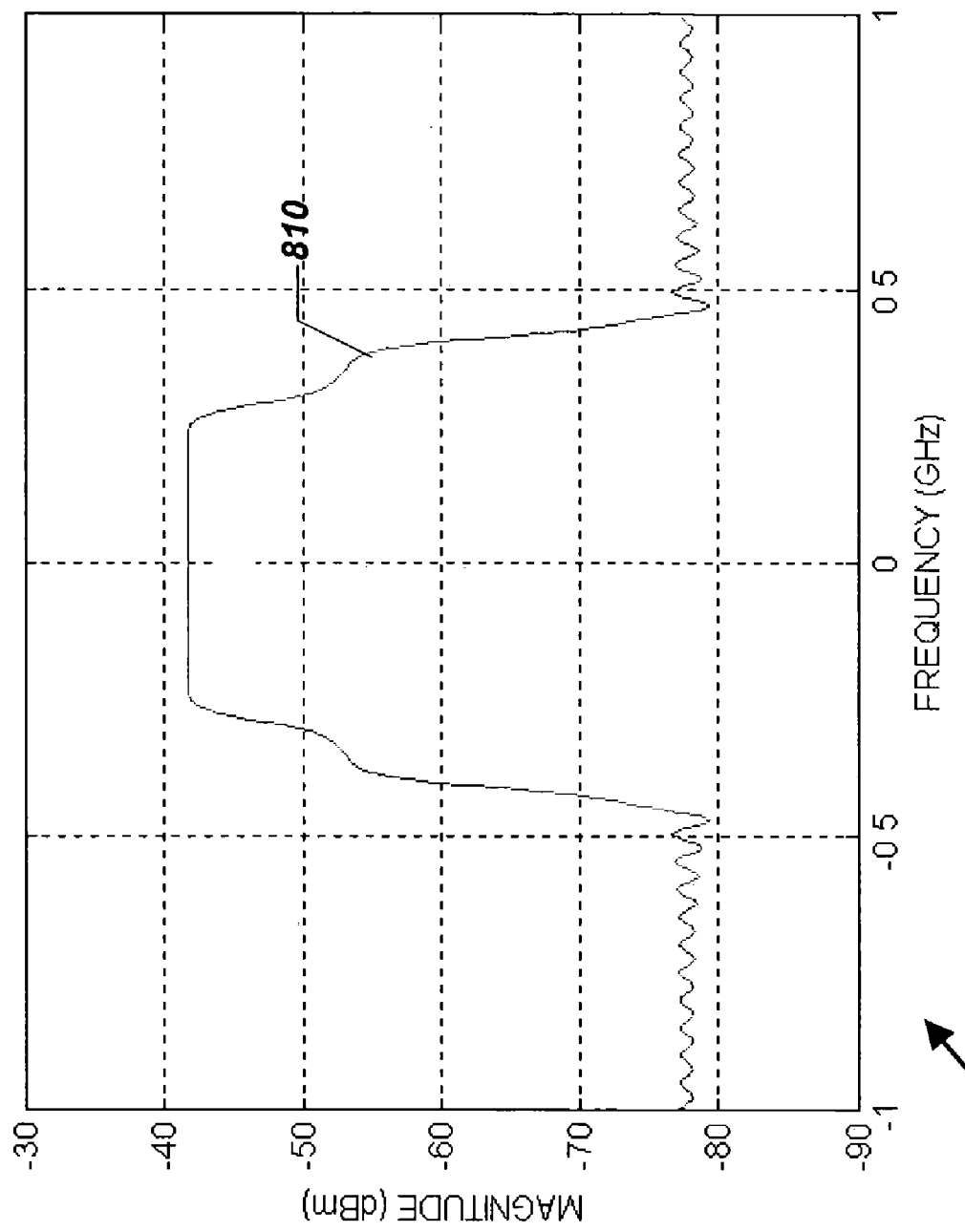
FIG. 8 is a frequency spectrum of the shaped digital pulses for the indoor UWB communication transmitter according to some embodiments.

Referring to FIG. 8 is a frequency response 800 of the positive and negative indoor shaped digital pulses 710 and 720, respectively, according to some embodiments. The frequency response 800 is symmetric at the center frequency and is used for the use in the indoor UWB operations.

Figure 9:
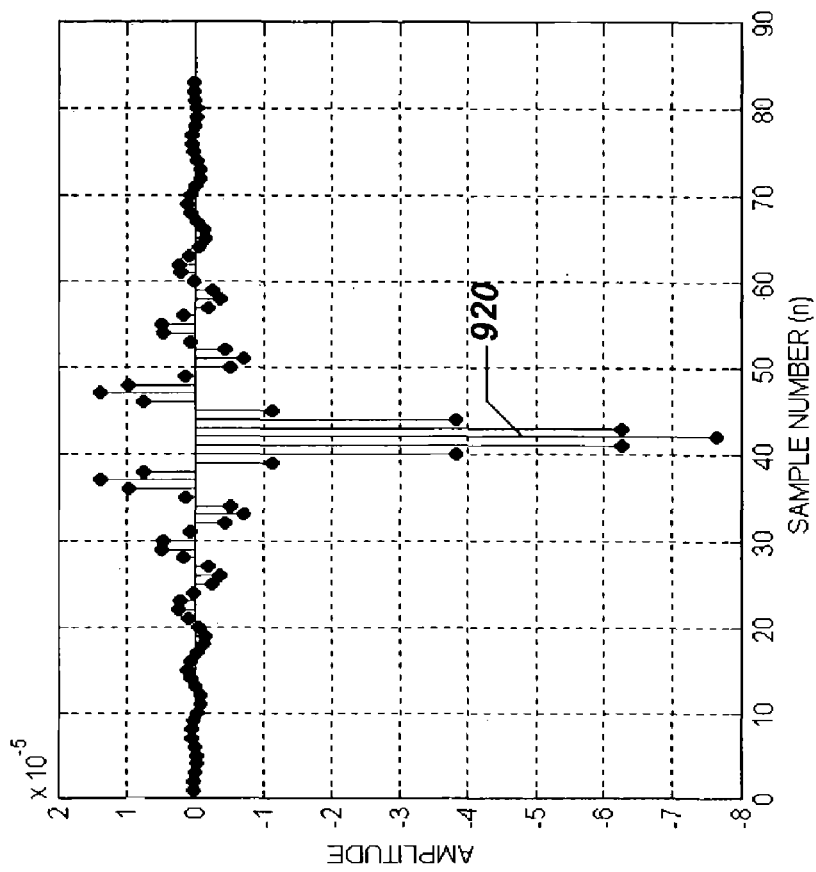
FIG. 9 is the shaped digital pulses for an outdoor UWB communication transmitter according to some embodiments.
Figure 9:
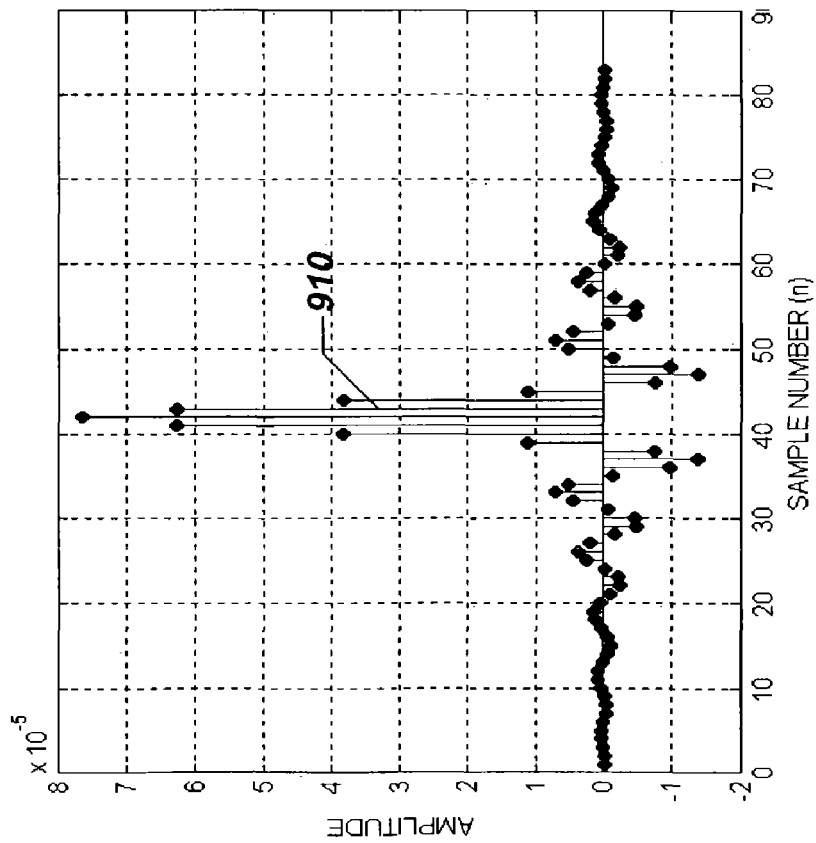

Now referring to FIG. 9 are impulse responses 900 of the positive outdoor shaped digital pulse ($h_{out}[n]$) 910 and the negative outdoor shaped digital pulse ($-h_{out}[n]$) 920, with a linear phase. A difference between the outdoor shaped digital pulse 910 and 920 is a 180-degree in phase. These two shaped digital pulses 910 and 920 are stored into the pulse banks 312 and 314, where are ROM or RAM memory banks. The impulse response of the positive outdoor shaped digital pulse 910 is listed in Table 4.

TABLE 4

| Pulse Taps | Value | Coefficients | Pulse Taps |
|---|---|---|---|
| h[0] | 7.6488735705936605e−005 | h[−21,],h[21] | −9.9696474129624093e−007 |
| h[−1],h[1] | 6.2636205884599369e−005 | h[−22],h[22] | 6.8001098631267257e−007 |
| h[−2],h[2] | 3.8360738472336015e−005 | h[−23],h[23] | 1.6055470083229580e−006 |
| h[−3],h[3] | 1.1315222826039952e−005 | h[−24],h[24] | 1.3544197859980424e−006 |
| h[−4],h[4] | −7.5438087863256088e−006 | h[−25],h[25] | 2.8906713844065611e−007 |
| h[−5],h[5] | −1.3715350107903802e−005 | h[−26],h[26] | −7.7640460252440758e−007 |
| h[−6],h[6] | −9.6549464333329795e−006 | h[−27],h[27] | −1.1590268443143087e−006 |
| h[−7],h[7] | −1.4025569435129311e−006 | h[−28],h[28] | −7.2082016980864959e−007 |
| h[−8],h[8] | 5.3003810907673923e−006 | h[−29],h[29] | 1.0449113646872343e−007 |
| h[−9],h[9] | 7.2459334117828691e−006 | h[−30],h[30] | 7.0581527869524552e−007 |
| h[−10],h[10] | 4.3825454945279616e−006 | h[−31],h[31] | 7.2894825863413297e−007 |
| h[−11],h[11] | −7.3762240948801741e−007 | h[−32],h[32] | 2.7772069871654161e−007 |
| h[−12],h[12] | −4.5458747488001017e−006 | h[−33],h[33] | −2.5824128353050490e−007 |
| h[−13],h[13] | −4.7131566336279298e−006 | h[−34],h[34] | −5.0913724964550914e−007 |
| h[−14],h[14] | −1.6403017957724223e−006 | h[−35],h[35] | −3.7669532172385286e−007 |
| h[−15],h[15] | 2.0411082705529443e−006 | h[−36],h[36] | −3.2564239303970273e−008 |
| h[−16],h[16] | 3.6642171169389545e−006 | h[−37],h[37] | 2.4370835675220430e−007 |
| h[−17],h[17] | 2.4832733363889074e−006 | h[−38],h[38] | 2.9201867311458947e−007 |
| h[−18],h[18] | −1.2626402560439206e−007 | h[−39],h[39] | 1.4137476178313894e−007 |
| h[−19],h[19] | −2.1121354877069656e−006 | h[−40],h[40] | −5.5504489846808052e−008 |
| h[−20],h[20] | −2.3106300667210457e−006 | h[−41],h[41] | −1.7766983155229356e−007 |

Figure 10:
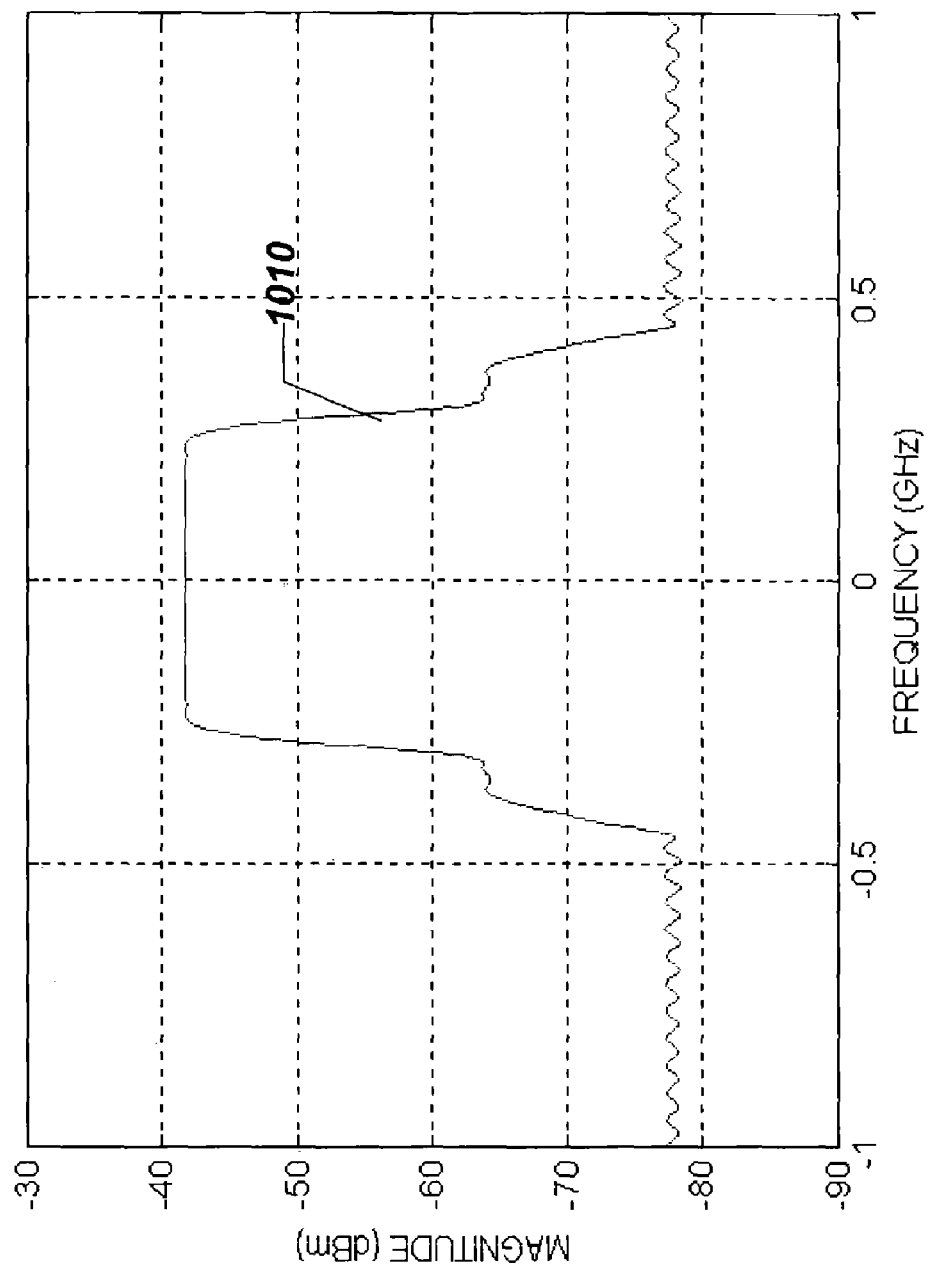
FIG. 10 is a frequency response of the shaped digital pulses for the outdoor UWB communication transmitter according to one embodiment.

Referring to FIG. 10 is a frequency response 1000 of the outdoor shaped digital pulses 1010 and 1020 according to some embodiments. The frequency response 1010 is also symmetric about the center frequency and is used for outdoor UWB operations.

Figure 11:
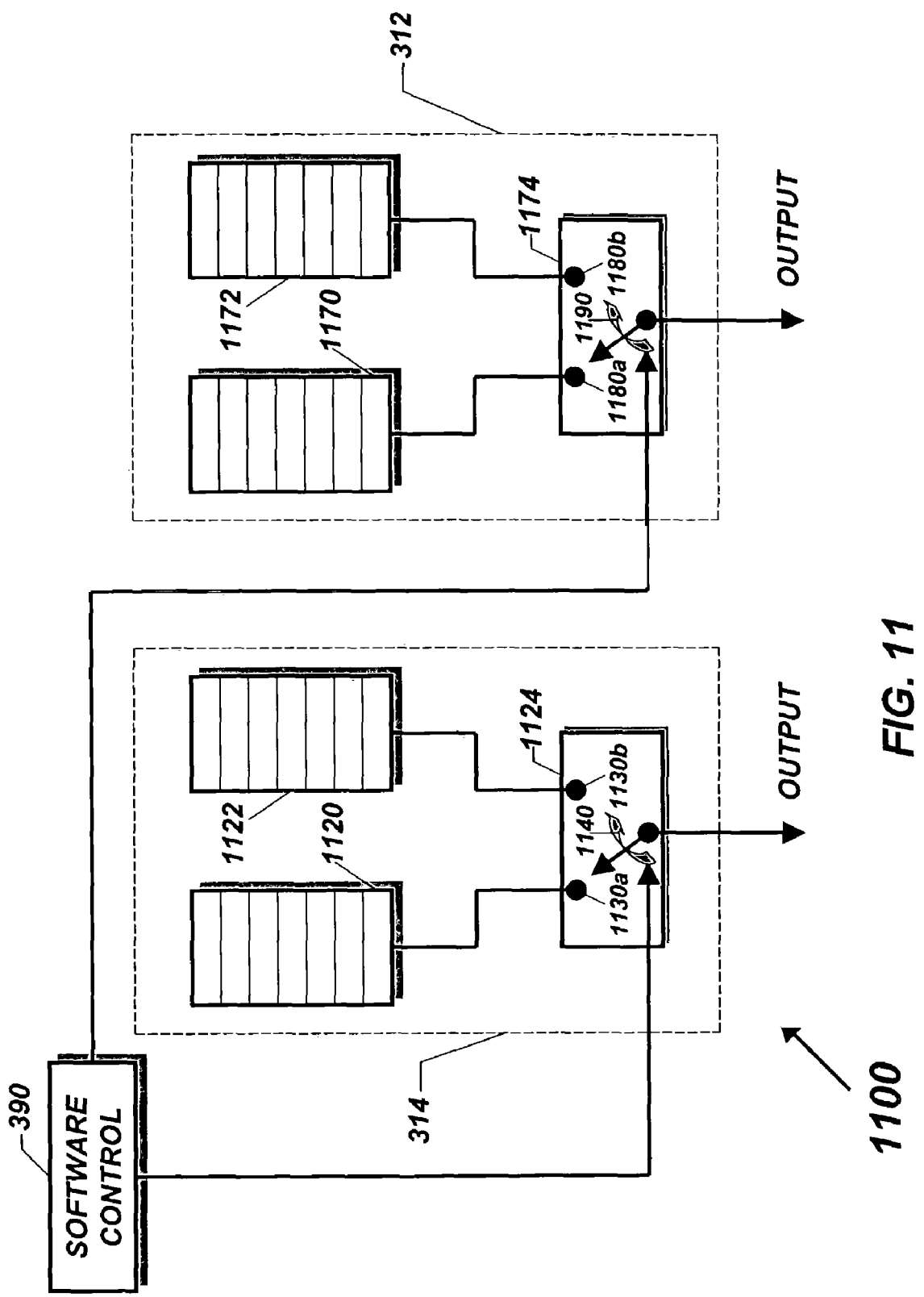
FIG. 11 is a block diagram of two pulse memory banks according to some embodiments.

Referring to FIG. 11 is a detailed block diagram 1100 of the negative pulse bank 312 and the positive pulse bank 314 according to some embodiments. The memory banks of 1120, 1122, 1170 and 1172 are RAMs or ROMs for storing the indoor shaped digital pulses 710 and 720, and the outdoor shaped digital pulses 910 and 920. The memory bank 1120 contains the positive indoor shaped digital pulse 710 while the memory bank 1170 includes the negative indoor shaped digital pulse 720. The memory bank 1122 consists of the positive outdoor shaped digital pulse 910 while the memory bank 1172 has the negative outdoor shaped digital pulse 920. The memory banks 1120 and 1122 are referred to as positive memory banks, and the memory banks 1170 and 1172 are called negative memory banks. There are two switch units 1124 and 1174. The switch 1124 is called a positive pulse switch unit and the switch 1174 is referred to as a negative pulse switch unit. Switches 1124 and 1174 are controlled by using a software control 390. The software control 390 can determine which one of positions should be connected to generate the shaped digital pulses for the BPSK or QPSK modulation during the indoor or outdoor UWB operations.

Figure 12:
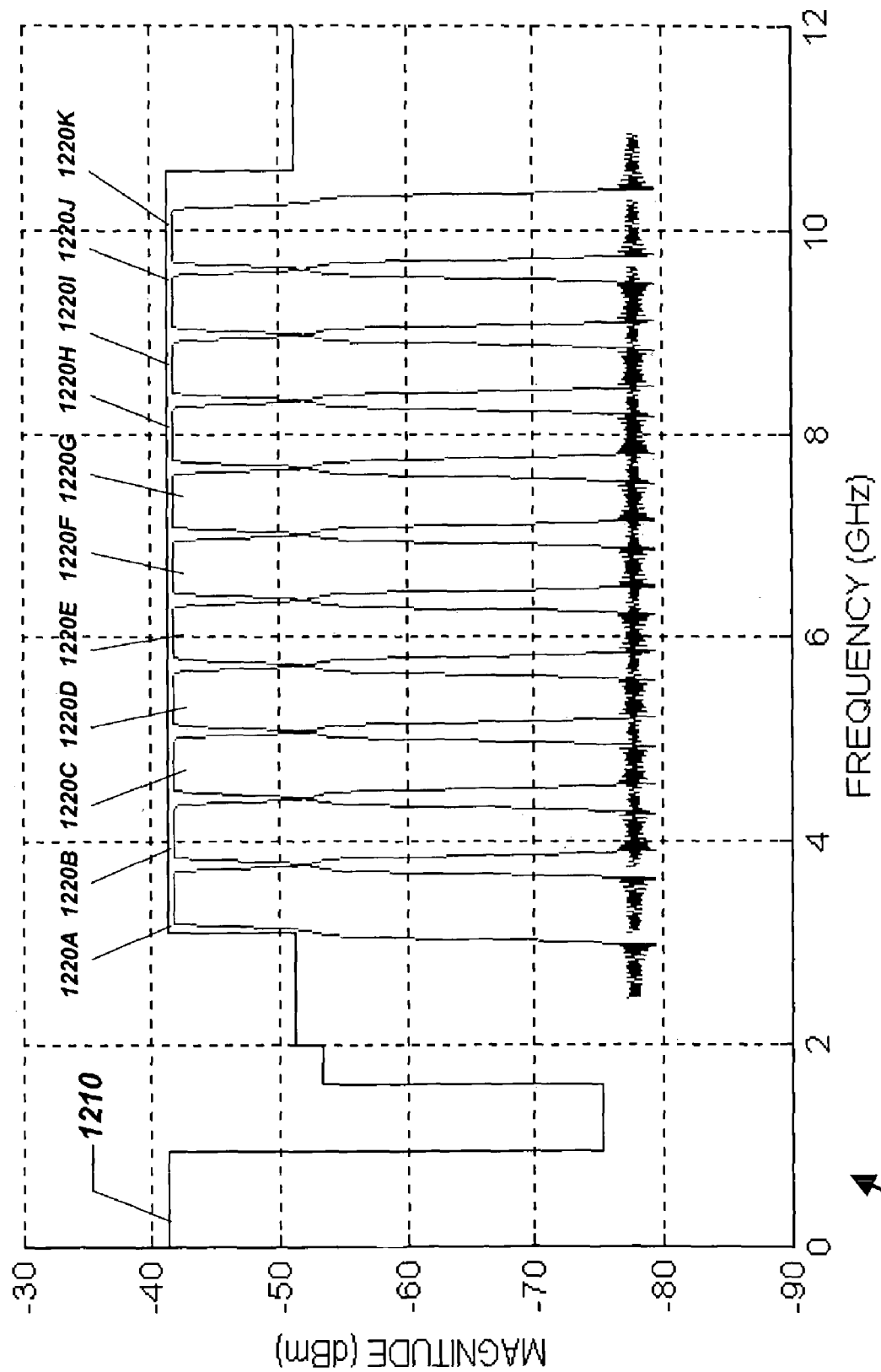
FIG. 12 is a frequency response of a multiband solution for the indoor UWB communication transmitter according to one embodiment.

FIG. 12 is an output frequency spectrum 1200 of the polyphase multichannel-based multicarrier pulse generator for the indoor UWB operation, including 11 transmitter channel spectrums 1220A-1220K according to some embodiments. An indoor FCC emission limitation 1210 is also shown in FIG. 12. Each channel has a frequency bandwidth of 650 MHz. As can be seen, all of the channels are fitted under the indoor FCC emission limitation 1210 with different carrier frequencies. The detail positions of each transmitter channel spectrum (dBm) along with the center, lower and upper frequencies (GHz) as well as channel frequency bandwidth (MHz) are listed in Table 5.

TABLE 5

| Multichannel Label | Center Frequency (GHz) | Lower Frequency (GHz) | Upper Frequency (GHz) | Frequency Bandwidth (MHz) |
|---|---|---|---|---|
| 1220A | 3.45 | 3.125 | 3.775 | 650 |
| 1220B | 4.10 | 3.775 | 4.425 | 650 |
| 1220C | 4.75 | 4.425 | 5.075 | 650 |
| 1220D | 5.40 | 5.075 | 5.725 | 650 |
| 1220E | 6.05 | 5.725 | 6.375 | 650 |
| 1220F | 6.70 | 6.375 | 7.025 | 650 |
| 1220G | 7.35 | 7.025 | 7.675 | 650 |
| 1220H | 8.00 | 7.675 | 8.325 | 650 |
| 1220I | 8.65 | 8.325 | 8.975 | 650 |
| 1220J | 9.30 | 8.975 | 9.625 | 650 |
| 1220K | 9.95 | 9.625 | 10.275 | 650 |

Figure 13:
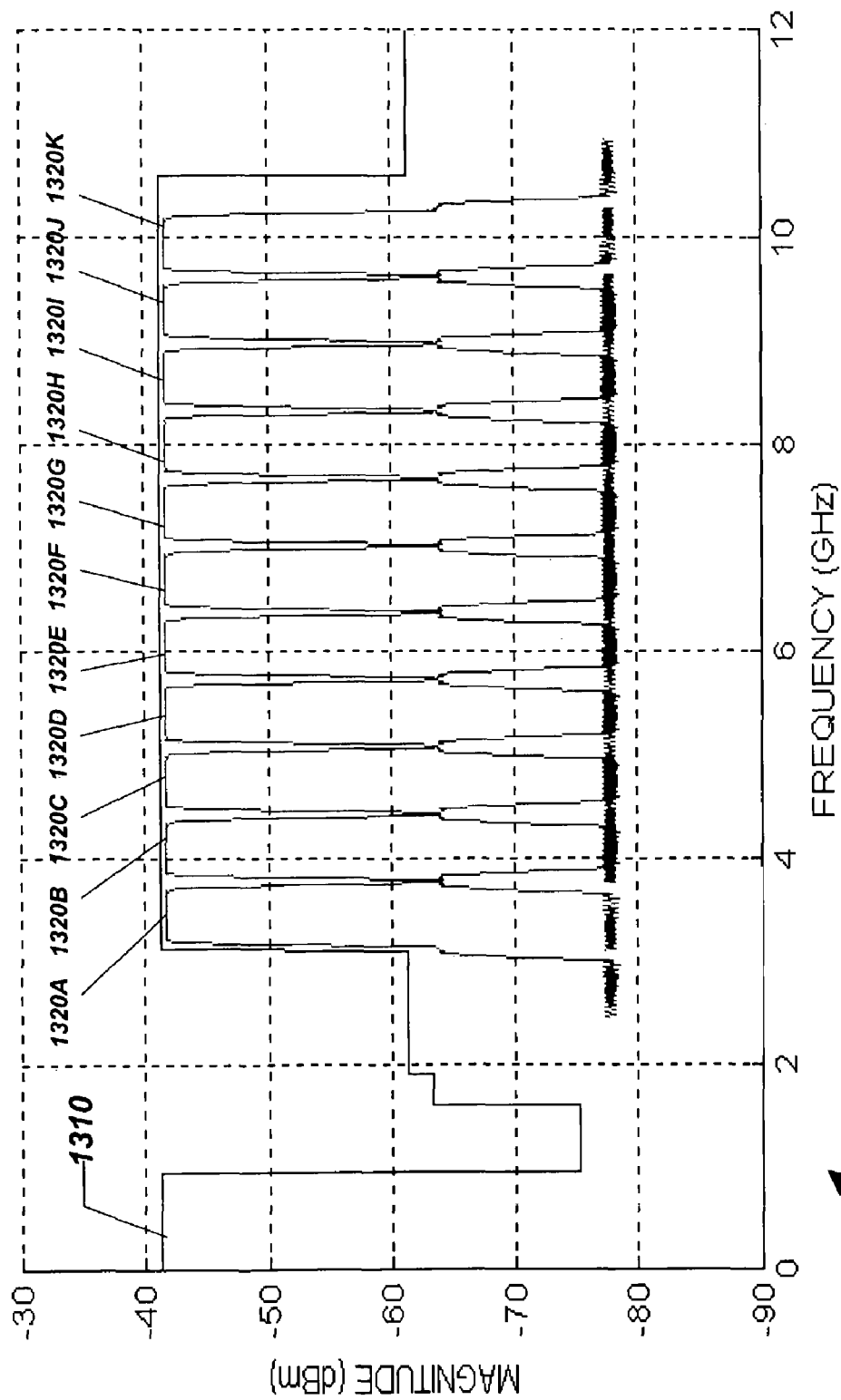
FIG. 13 is a frequency response of the multiband solution for the outdoor UWB communication transmitter according to one embodiment.

FIG. 13 is an output frequency spectrum 1300 of the polyphase multichannel-based multicarrier pulse generator for the outdoor UWB operation, including 11 transmitter channel spectrums 1320A-1320K along with the outdoor FCC emission limitation 1310 according to some embodiments. Each channel also has a frequency bandwidth of 650 MHz. It is also clear that all of the channels at different carrier frequencies are fitted under the outdoor FCC emission limitation 1310.

Figure 14:
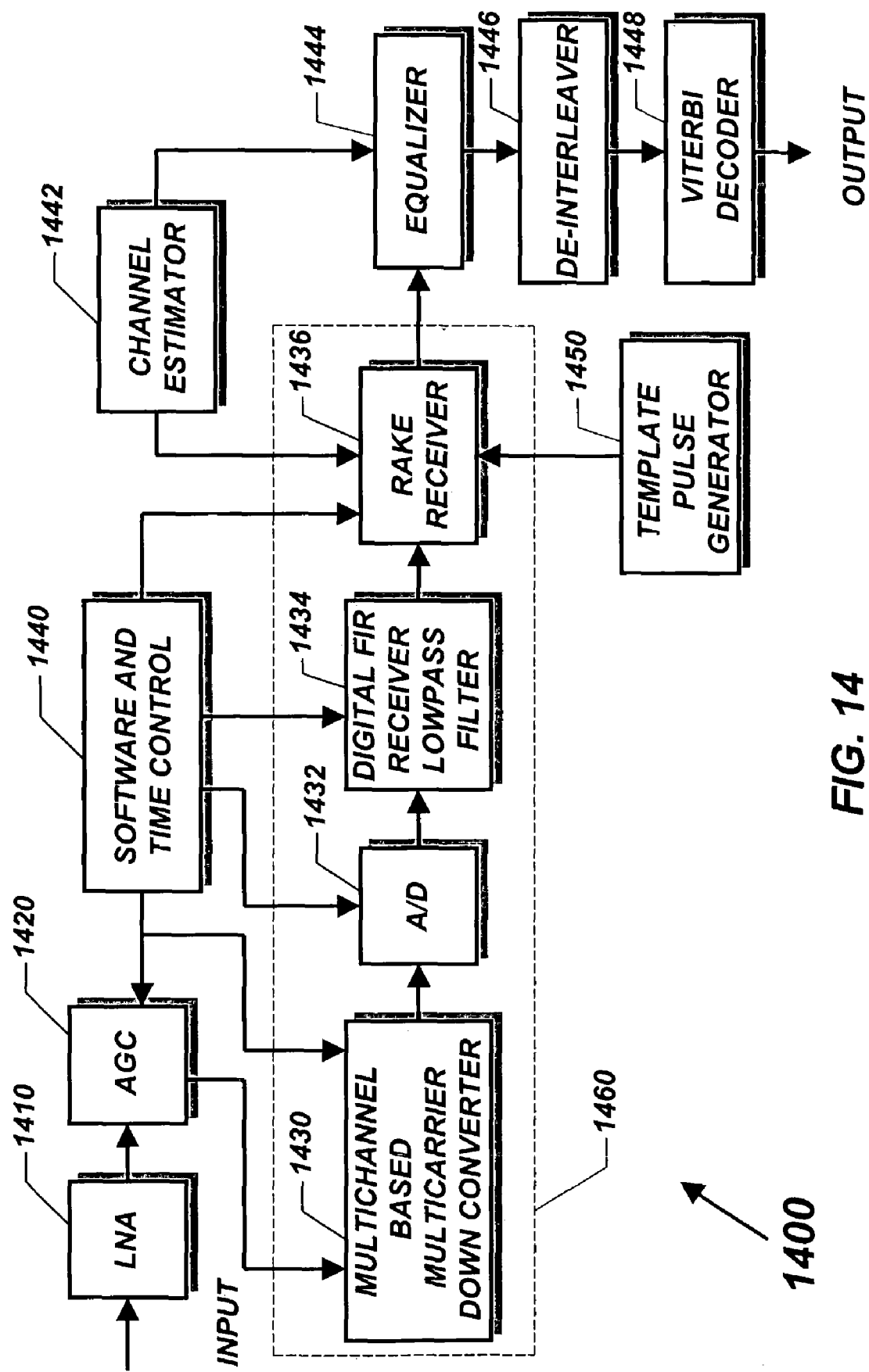
FIG. 14 is a block diagram of a multiband UWB receiver for the indoor and outdoor operation according to some embodiments.

FIG. 14 is a block diagram of a multiband UWB communication receiver 1400 for the indoor and outdoor operations according to some embodiments. A low noise amplifier (LNA) 1410, which is coupled to an automatic gain control (AGC) 1420, receives the UWB signals from an antenna. The output of LNA 1410 is passed through the AGC 1420 to adjust amplitude of the UWB signals for a multichannel-based multicarrier down converter 1430. A software and time control 1440 is use to control the AGC 1420 and the multichannel-based multicarrier down converter 1430. The bandlimited UWB analog signals of the output multichannel-based multicarrier down converter 1430 are then sampled and quantized by using an A/D converter 1432 at a sampling rate of 720 MHz. The output digital signals of the A/D converter 1432 are filtered by using an indoor or outdoor digital receiver lowpass filter 1434 to remove the out of band signals. The indoor or outdoor digital receiver lowpass filter 1434 is controlled by a software and time control 1440. The output data of the digital receiver lowpass filter 1434 is used for a rake receiver 1436. A channel estimator 1442 is used to estimate a channel phase and frequency. The channel phase and frequency information are then passed into the rake receiver 1436. The rake receiver 1436 calculates a correlation between the received UWB pulse signals and template pulses, which are provided by using a template pulse generator 1450, and performs a coherent combination. The output of the rake receiver 1436 is passed to an equalizer 1444, which also receives the channel phase and frequency information from the channel estimator 1442, to eliminate inter-symbol interference (ISI), inter-channel interference (ICI), and inter-pulse interference (IPI). Then, the output symbol data of the equalizer 1444 is passed to a de-interleaver 1446. Thus, the symbol data is de-interleaved by using the de-interleaver 1446. The output symbol data of the de-interleaver 1446 is used for Viterbi decoder 1448 to decode the encoded data and to produce the user data bits at 3,575 Mbps. The entire section unit 1460 is referred to as a polyphase multichannel combiner of the multicarrier down converter.

Figure 15:
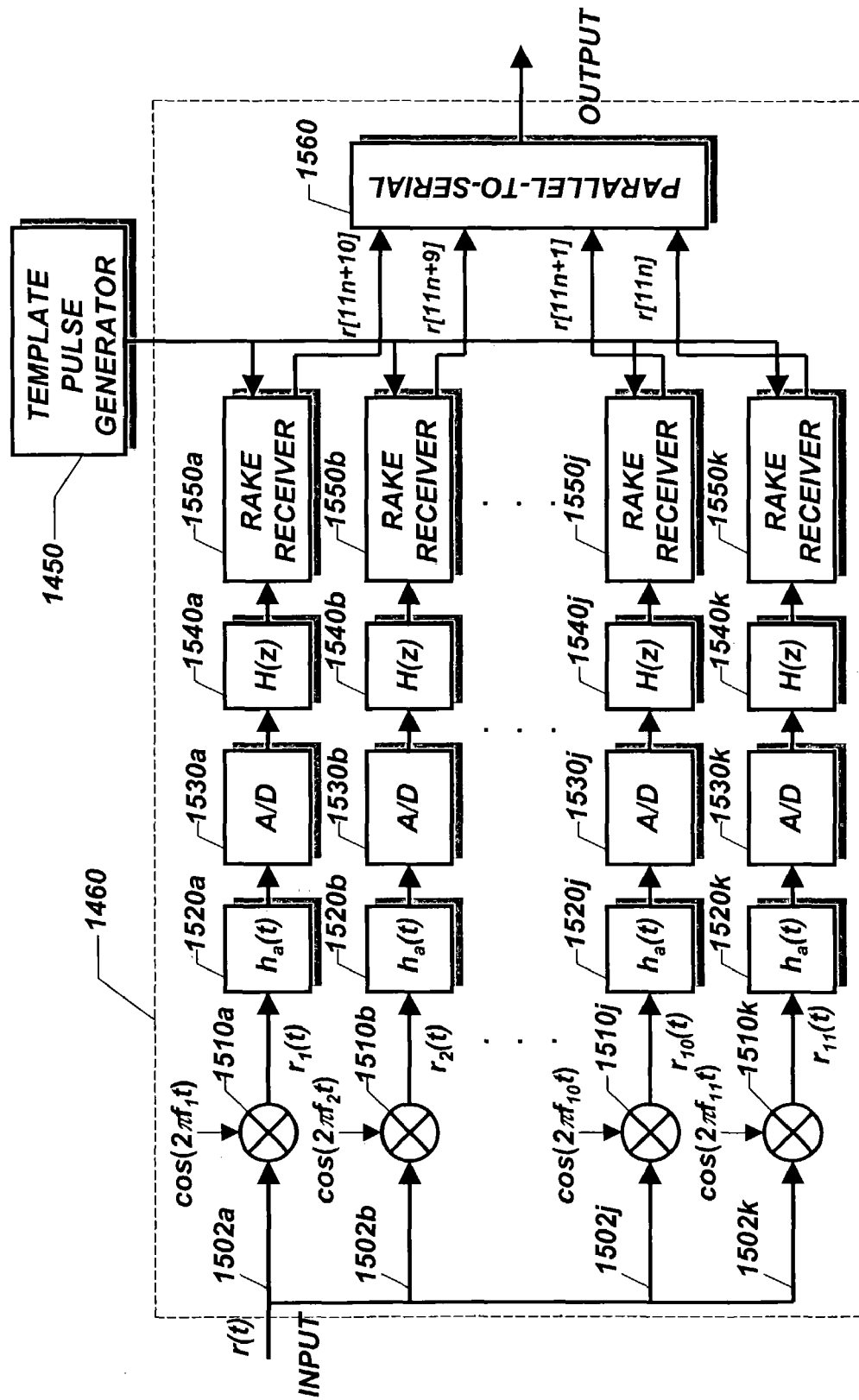
FIG. 15 is a detailed block diagram of a polyphase-based multichannel and multicarrier down converter for the multiband UWB receiver according to one embodiment.

Referring to FIG. 15 is a detailed block diagram 1500 of the polyphase multichannel combiner of the multicarrier down converter 1460 according to the present invention. The received signals r(t) are formed 11 channel signals labeled with 1502a-1502k, which are multiplied by carrier frequency functions of $\cos(2\pi f_1 t), \ldots, \cos(2\pi f_{11} t)$, to produce the output signals $r_1(t), \ldots, r_{11}(t)$, respectively. In a parallel form, all of the signals $r_1(t), \ldots, r_{11}(t)$ are then passed to a set of parallel anti-aliasing analog filters 1520a-1520k, which produce the bandlimited signals for a set of parallel A/D converters 1530a-1530k followed by digital receiver lowpass filters 1540a-1540k. Then, the output signals of the digital receiver filters 1540a-1540k are used for a set of rake receivers 1550a-1550k to perform correlation measures between the received pulses and the template pulses, which are generated from the template pulse generator 1450. Thus, the output channel signals r[11n+10], ..., rs[11n] of the rake receiver 1550a-1550k are combined by using a polyphase upsampling structure to generate the output sequence.

Figure 16:
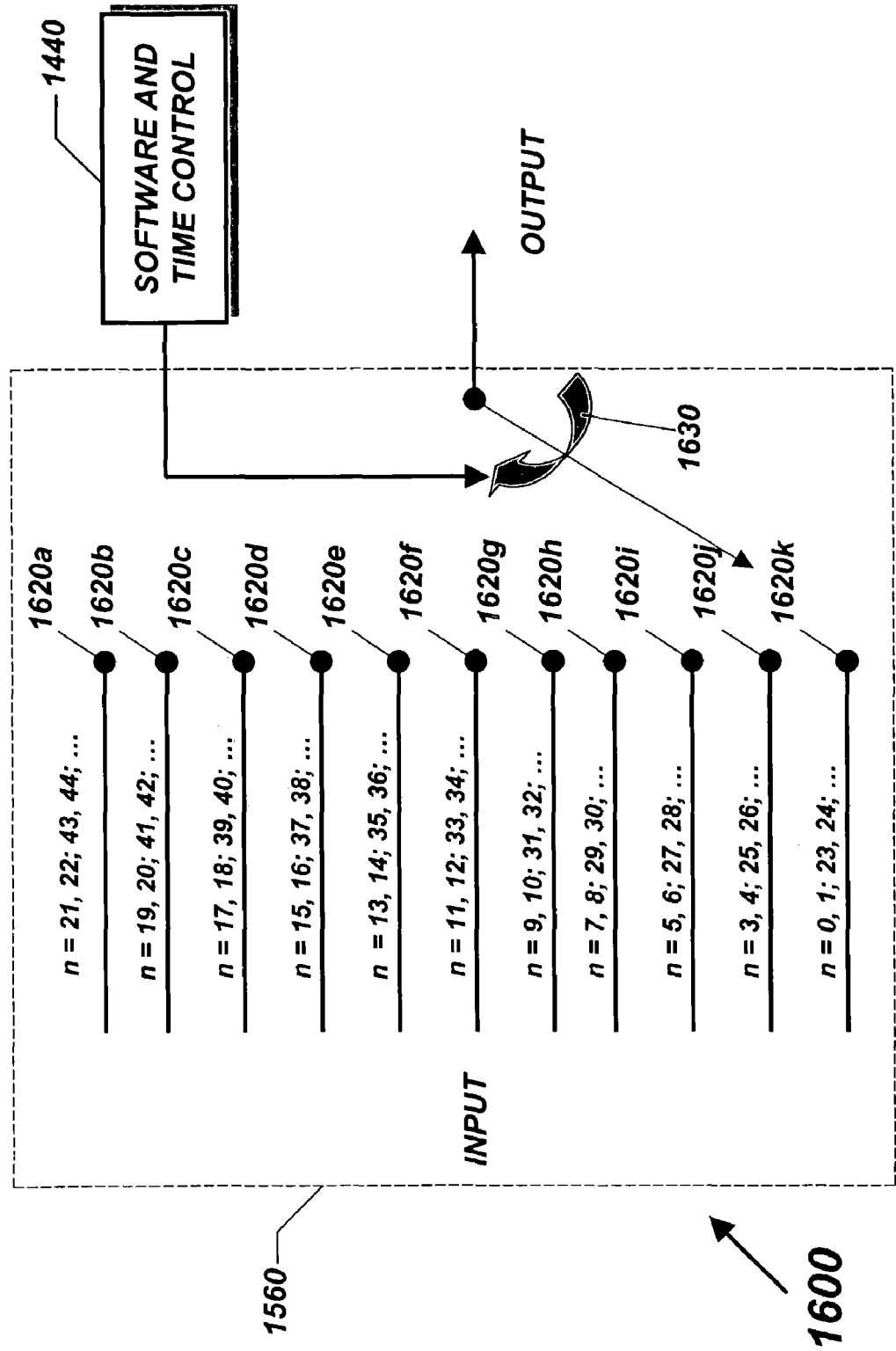
FIG. 16 is a detailed block diagram of a polyphase-based parallel-to-serial (P/S) according one embodiment.

Referring to FIG. 16 is a detailed block diagram 1600 of a polyphase-based parallel-to-serial (P/S) 1560 according to one embodiment. The input sequence, including 11 channels 1620a-1620k in parallel, has a length of symbol M. A switch 1630 rotates from a position 1620k to a position 1620a with a uniform speed at every two symbols to produce an output sequence with a symbol length of 11M. A software and time control 1440 controls the switch 1630 during the operation. The speed of the switch 1630 is adjustable at a uniform speed for a different number of symbols.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A multiband ultra wideband (UWB) communication transmitter comprising:
   an encoder coupled to an interleaver;
   said interleaver coupled to a polyphase-based multichannel;
   said polyphase-based multichannel coupled to a shaped pulse generator;
   said shaped pulse generator coupled to a multichannel-based multicarrier modulator;
   said shaped pulse generator generates shaped digital pulses;
   said multichannel-based multicarrier modulator coupled to a power amplifier (PA); and
   a clock control coupled to said polyphase-based multichannel, said shaped pulse generator, and said multichannel-based multicarrier modulator.

2. The multiband UWB communication transmitter of claim 1 wherein a combination transceiver structure of the polyphase-based multichannel, the shaped pulse generator, and the multichannel-based multicarrier modulator further includes:
   positive and negative pulse banks coupled to two digital-to-analog (D/A) converters;
   an adjustable serial-to-parallel (S/P) unit coupled to N multichannel switch units, where N is an integer and greater than 1;
   the N multichannel switch units coupled to N multiplier units;
   each of the multiplier units has a unique carrier;
   the N multiplier units coupled to a summation;
   the two D/A converters coupled to the N multichannel switch units; and
   a software control coupled to the adjustable S/P unit, the positive and negative pulse banks, and the N multichannel switch units.

3. The multiband UWB communication transmitter of claim 2 wherein the adjustable S/P unit is used to generate N parallel channels from one serial symbol separated with an equal space that is programmable and controllable by the software control, where N is an integer and greater than 1.

4. The multiband UWB communication transmitter of claim 2 wherein said combination transceiver structure is programmable and generates scalability shaped digital pulses with different carriers for N channels, where N is an integer and greater than 1.

5. The multiband UWB communication transmitter of claim 1 wherein said shaped pulse generator further includes:
   a positive pulse bank containing two positive memory banks with two outputs connected to a positive pulse switch unit;
   a negative pulse bank containing two negative memory banks with two outputs connected to a negative pulse switch unit;
   a software control coupled to the positive pulse switch unit and the negative pulse switch unit;
   the positive pulse switch unit and the negative pulse switch unit has two inputs and one output; and
   the two positive memory banks and the two negative memory banks are either random access memory (RAM) or read-only-memory (ROM).

6. The multiband UWB communication transmitter of claim 1 wherein the shaped digital pulses are one type of positive and negative indoor shaped digital pulses having a phase difference, and another type of positive and negative outdoor shaped digital pulses with the phase difference.

7. The multiband UWB communication transmitter of claim 6 wherein said positive and negative indoor shaped digital pulses are used for an indoor UWB communication transceiver and said positive and negative outdoor shaped digital pulses are used for an outdoor UWB communication transceiver.

8. The multiband UWB communication transmitter of claim 6 wherein said positive and negative indoor or outdoor shaped digital pulses are used to represent one symbol for binary phase-shift keying (BPSK) modulation or to represent two symbols for quadrature phase-shift keying (QPSK) modulation with a delay time of said positive and negative indoor or outdoor shaped digital pulses in position.

9. The multiband UWB communication transmitter of claim 2 wherein said combination transceiver structure provides eleven transmission data rates with a scalability from 650 Msps to 7.15 Gsps.

10. A multiband ultra wideband (UWB) transceiver includes:
    a shaped pulse generator coupled to N multichannel switch units, where N is an integer and greater than 1;
    the shaped pulse generator further comprising a positive pulse bank, a negative pulse bank, and two digital-to-analog (D/A) converters;
    the positive pulse bank further having two positive memory banks and a positive pulse switch unit;
    the negative pulse bank further enclosing two negative memory banks and a negative pulse switch unit;
    the two positive memory banks storing a positive indoor shaped digital pulse and a positive outdoor shaped digital pulse;
    the two negative memory banks storing a negative indoor shaped digital pulse and a negative outdoor shaped digital pulse;
    the two D/A converters coupled to the N multichannel switch units;
    a software control coupled to the positive pulse switch unit and the negative pulse switch unit; and
    the software control coupled to the positive and negative pulse banks and the N multichannel switch units.

11. The multiband UWB transceiver of claim 10 wherein said two positive memory banks and said two negative memory banks are either random access memories (RAMs) or read only memories (ROMs).

12. The multiband UWB transceiver of claim 10 wherein said N multichannel switch units coupled to one of the two D/A converters that connects to one of the two positive memory banks storing said positive indoor shaped digital pulse or storing said positive outdoor shaped digital pulse based on one "0" symbol for a binary phase-shift keying (BPSK) modulation during the indoor or outdoor UWB operations.

13. The multiband UWB transceiver of claim 10 wherein said N multichannel switch units coupled to one of the two D/A converters that connects to one of the two negative memory banks storing said negative indoor shaped digital pulse or storing said negative outdoor shaped digital pulse based on one "1" symbol for the BPSK modulation during the indoor or outdoor UWB operations.

14. The multiband UWB transceiver of claim 10 wherein said N multichannel switch units coupled to one of the two D/A converters that connects to one of the two positive memory banks storing said positive indoor shaped digital pulse or storing said positive outdoor shaped digital pulse based on the most significant symbol "0" of two symbols for a quadrature phase-shift keying (QPSK) modulation during the indoor or outdoor UWB operations.

15. The multiband UWB transceiver of claim 10 wherein said N multichannel switch units coupled to one of the two D/A converters that connects to one of the two negative memory banks storing said negative indoor shaped digital pulse or storing said negative outdoor shaped digital pulse based on the most significant symbol "1" of two symbols for the QPSK modulation during the indoor or outdoor UWB operations.

16. The multiband UWB transceiver of claim 10 wherein said positive pulse switch and said negative pulse switch connect to one of the two positive memory banks containing the positive indoor shaped digital pulses and one of the two negative memory banks containing the negative indoor shaped digital pulses during the indoor UWB operation.

17. The multiband UWB transceiver of claim 10 wherein said positive pulse switch and said negative pulse switch connect to one of the two positive memory banks containing the positive outdoor shaped digital pulses and one of the two negative memory banks containing the negative outdoor shaped digital pulses during the outdoor UWB operation.

18. A multiband ultra wideband (UWB) communication receiver comprising:
   a low noise amplifier (LNA) coupled to an automatic gain control (AGC);
   the AGC coupled to a multichannel-based multicarrier down converter unit;
   the multichannel-based multicarrier down converter unit coupled to an analog-to-digital (A/D) converter unit;
   the A/D converter unit coupled to a digital receiver lowpass filter unit;
   the digital receiver lowpass filter unit coupled to a rake receiver unit;
   a template pulse generator coupled to the rake receiver unit;
   the rake receiver unit coupled to an equalizer;
   the equalizer coupled to a deinterleaver;
   the deinterleaver coupled to a decoder;
   a channel estimator coupled to the rake receiver unit and the equalizer; and
   a software and time control coupled to the AGC, the multichannel-based multicarrier down converter unit, the A/D converter unit, the digital receiver lowpass filter unit, and the rake receiver unit.

19. The multiband UWB communication receiver of claim 18 wherein said the A/D converter unit includes N anti-aliasing analog filters followed by N A/D converters and said N A/D converters have the same resolution and the same sampling rate, where N is an integer and greater than 1.

20. The multiband UWB communication receiver of claim 18 wherein said the digital receiver lowpass filter unit having N digital receiver lowpass finite impulse response (FIR) filters and the rake receiver unit including N rake receivers and the digital receiver lowpass FIR filters coupled to the N rake receivers followed by an adjustable polyphase-based parallel-to-serial (P/S) unit.

* * * * *